July 13, 1965  M. F. GOURAN ETAL  3,194,942

AUTOMATIC RELAY WELDING MACHINE

Filed Sept. 19, 1961  15 Sheets-Sheet 1

INVENTORS
**Mark F. Gouran
Clyde A. Cobb
Leon Kazan** by *Wenderoth, Lind & Ponack*
ATTORNEYS

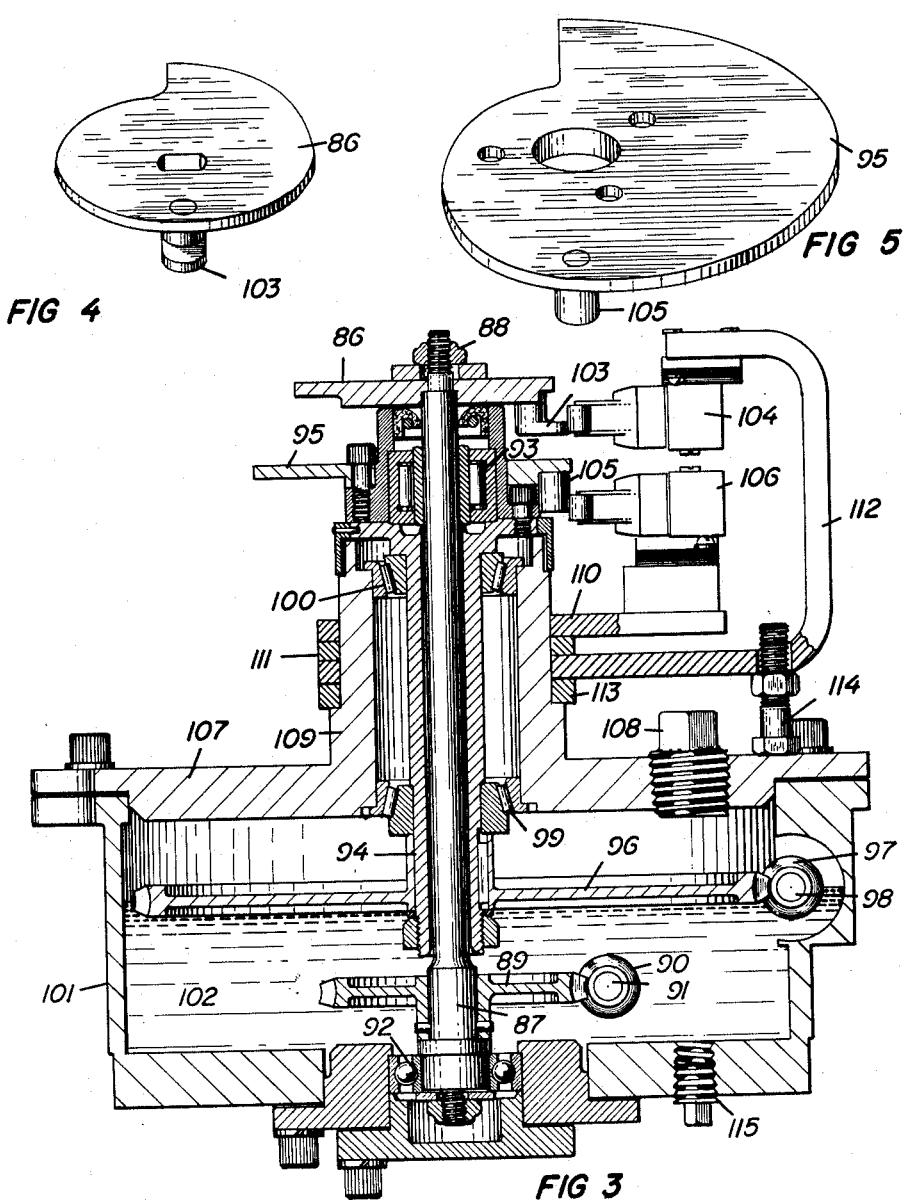

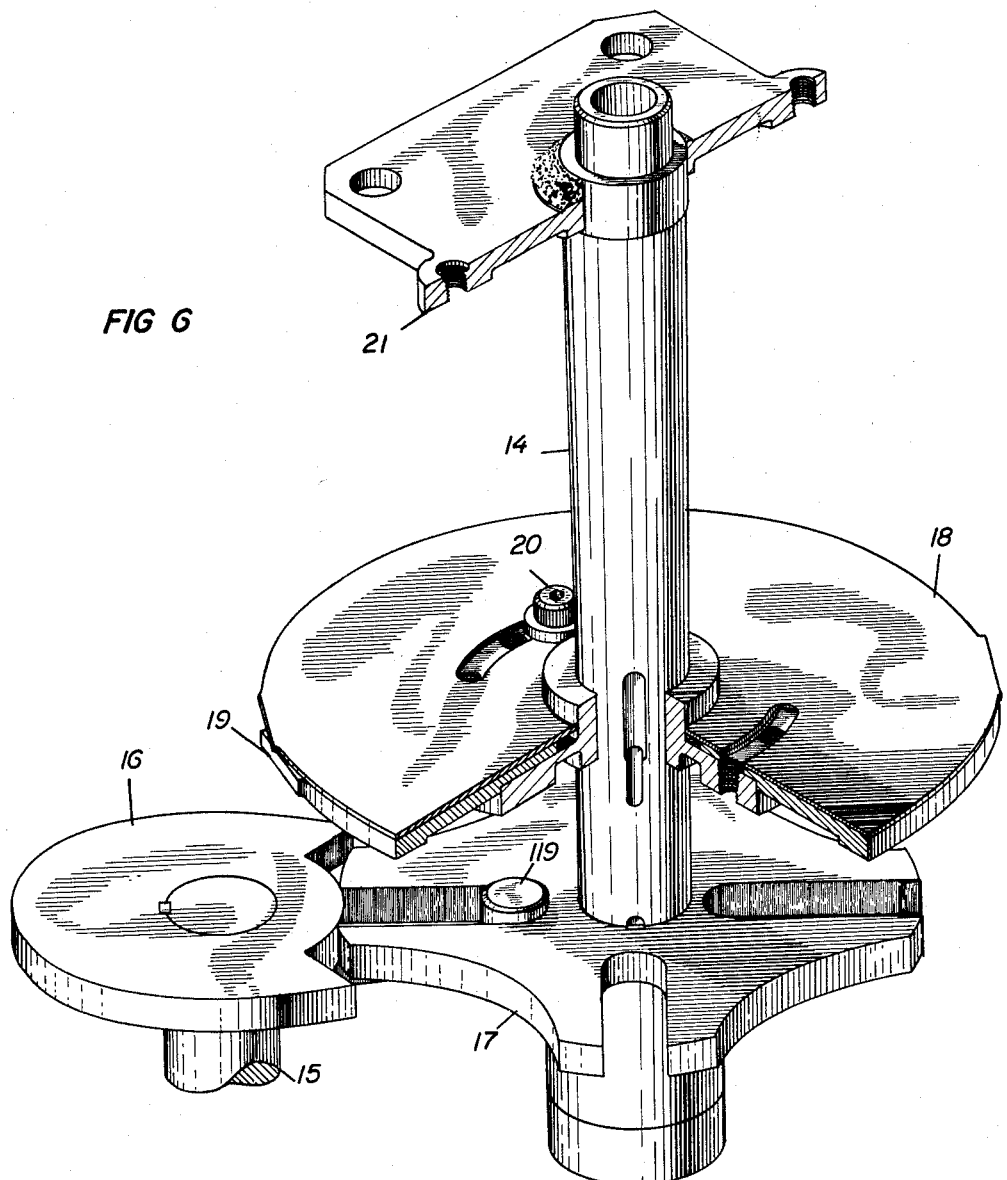

INVENTORS
Mark F. Gouran
Clyde A. Cobb
Leon Kazan

ATTORNEYS

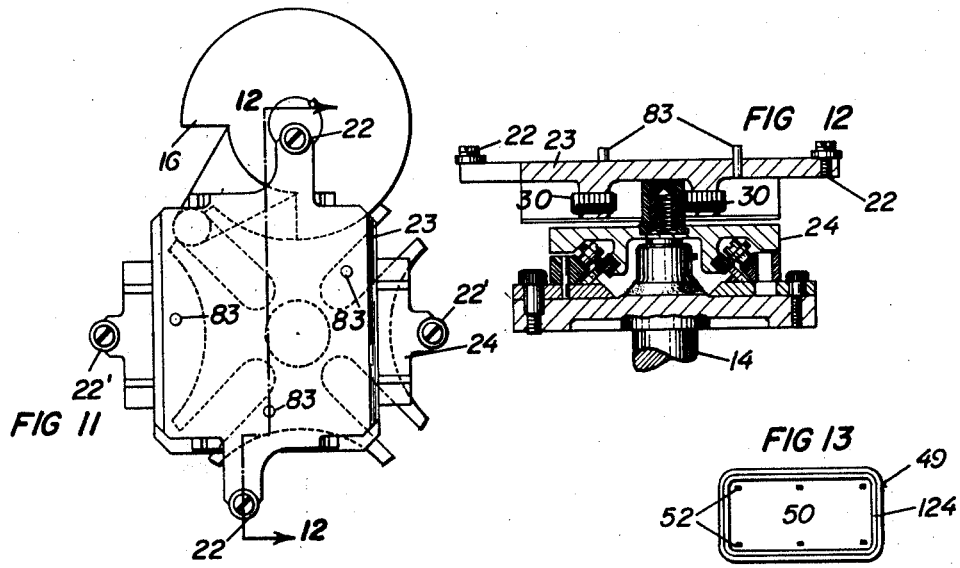
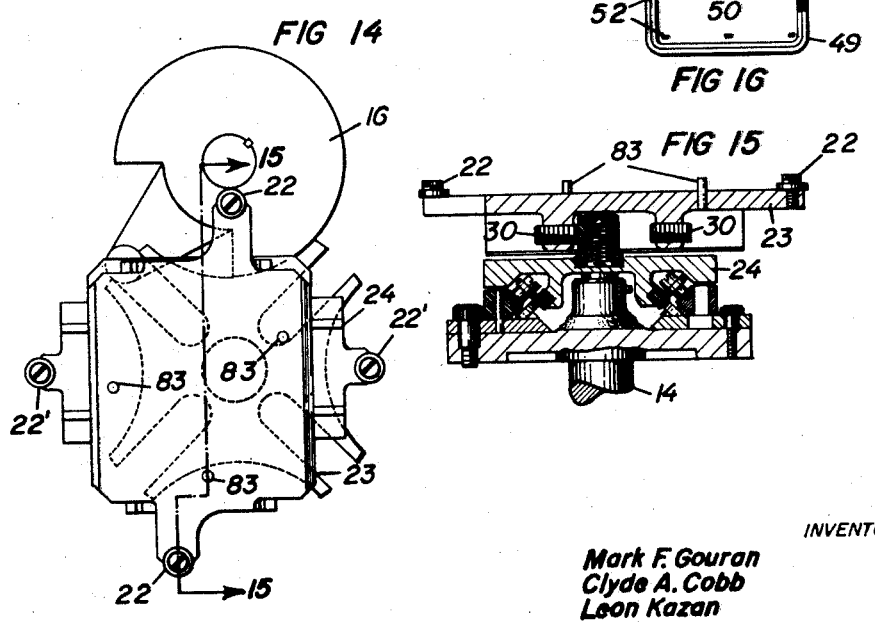

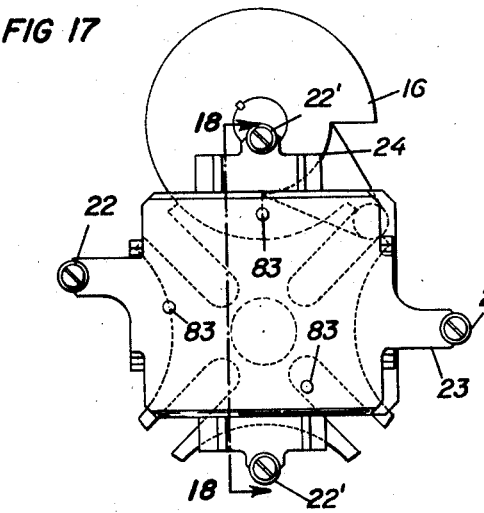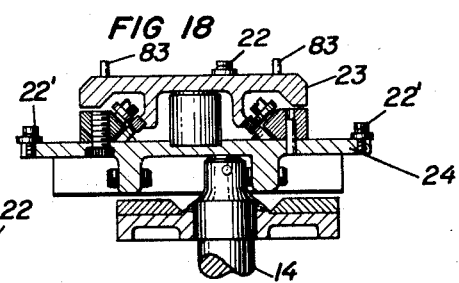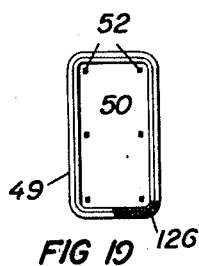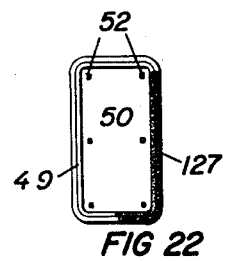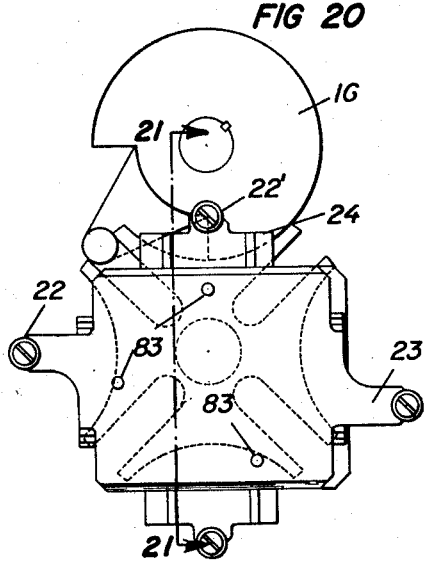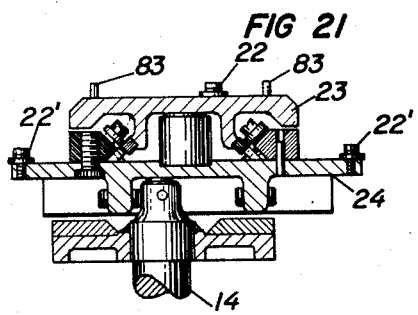
INVENTORS
Mark F. Gouran
Clyde A. Cobb
Leon Kazan
ATTORNEYS July 13, 1965     M. F. GOURAN ETAL     3,194,942
AUTOMATIC RELAY WELDING MACHINE
Filed Sept. 19, 1961     15 Sheets-Sheet 8

INVENTORS
Mark F. Gouran
Clyde A. Cobb
Leon Kazan by *Wenderoth, Lind & Ponack*
ATTORNEYS

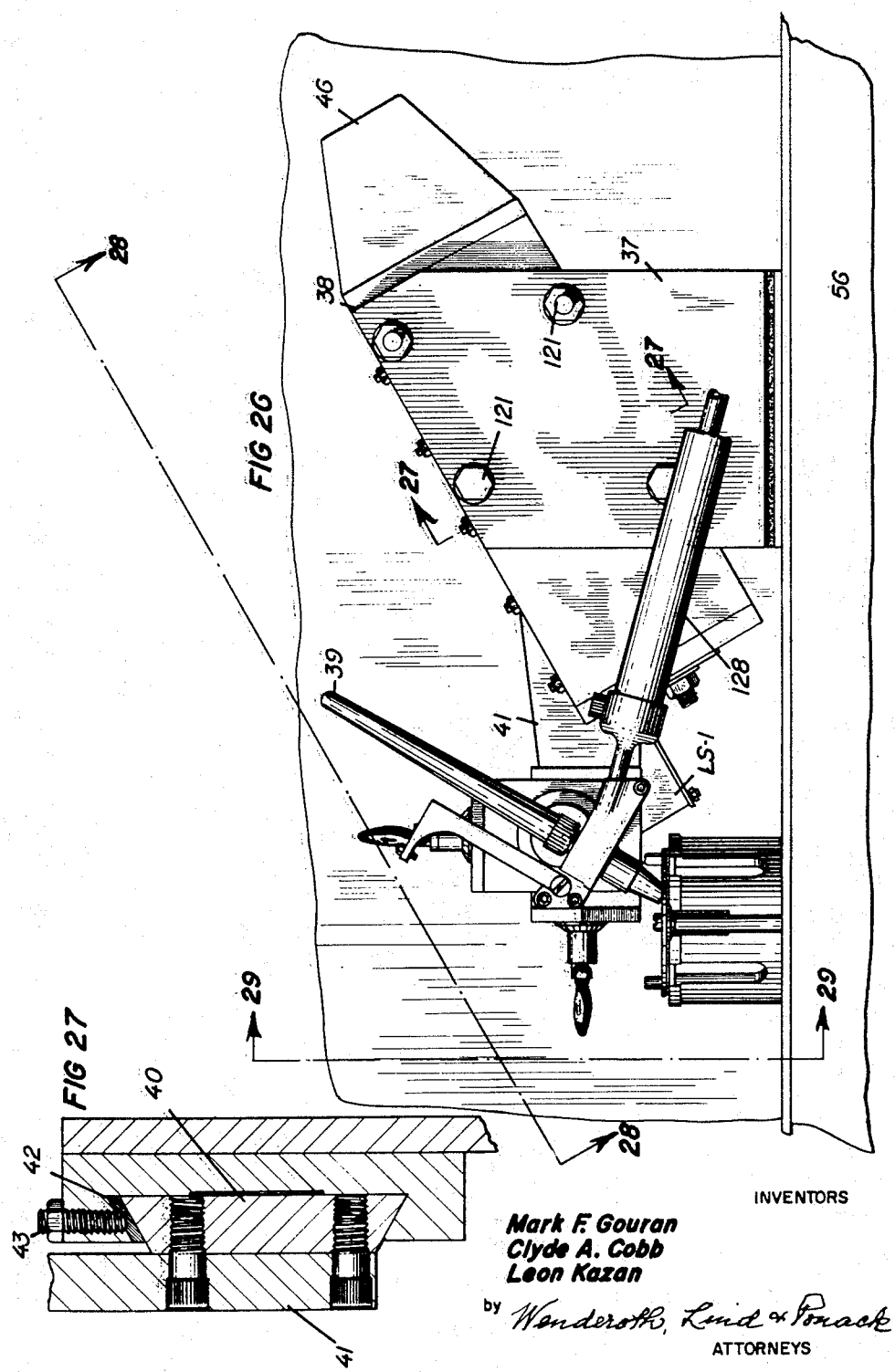

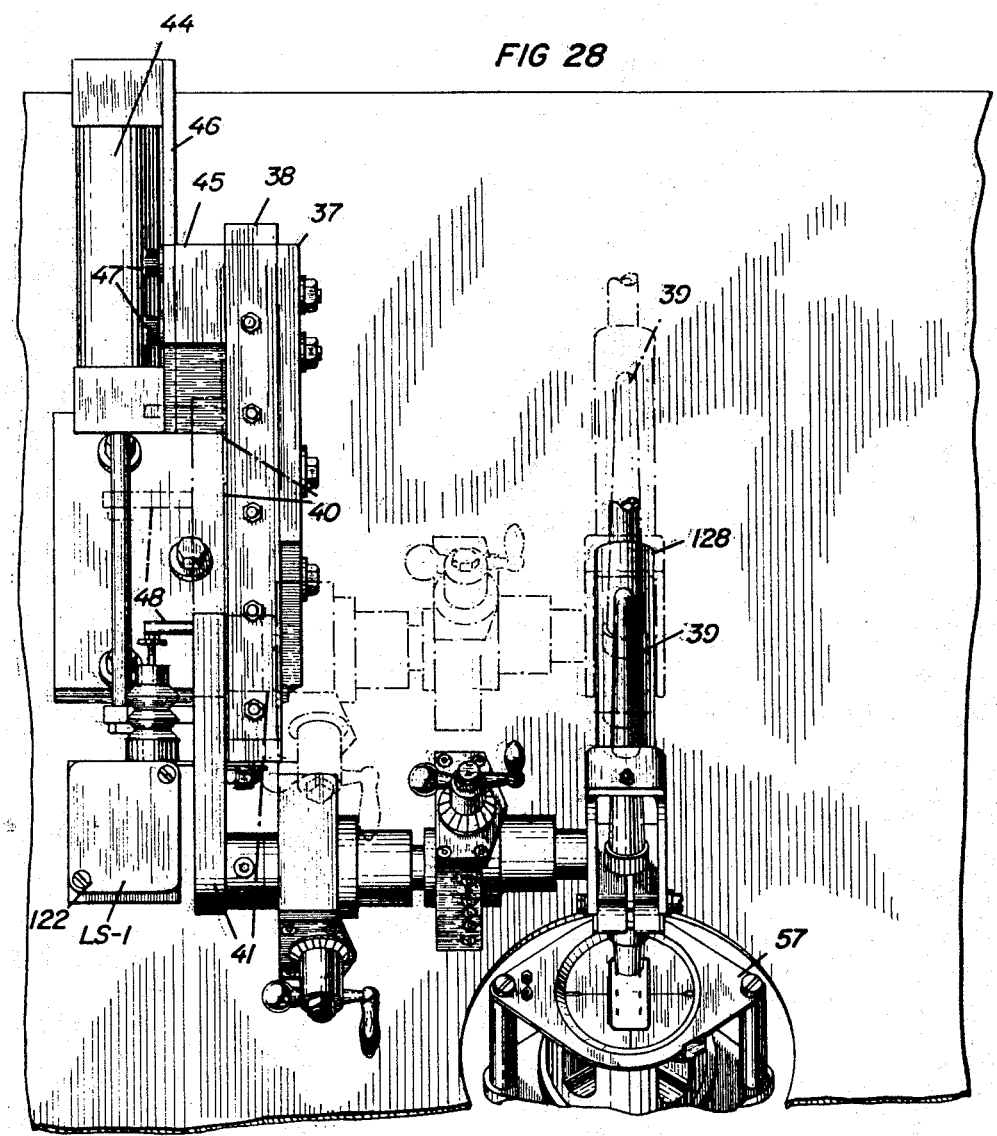

July 13, 1965  M. F. GOURAN ETAL  3,194,942
AUTOMATIC RELAY WELDING MACHINE
Filed Sept. 19, 1961  15 Sheets-Sheet 11

INVENTORS
Mark F. Gouran
Clyde A. Cobb
Leon Kazan
by Wenderoth, Lind & Ponack
ATTORNEYS

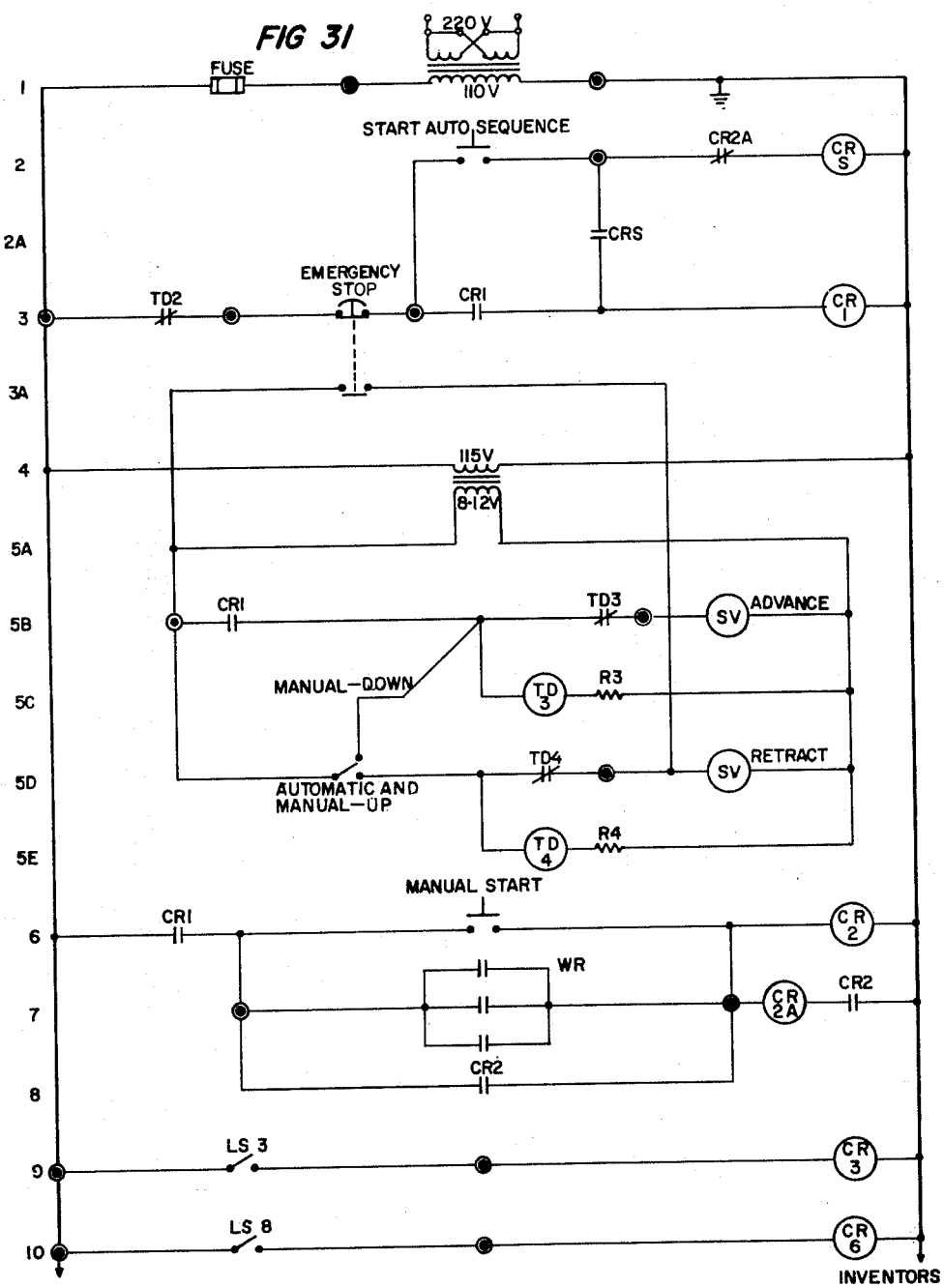

July 13, 1965     M. F. GOURAN ETAL     3,194,942
AUTOMATIC RELAY WELDING MACHINE
Filed Sept. 19, 1961     15 Sheets-Sheet 13
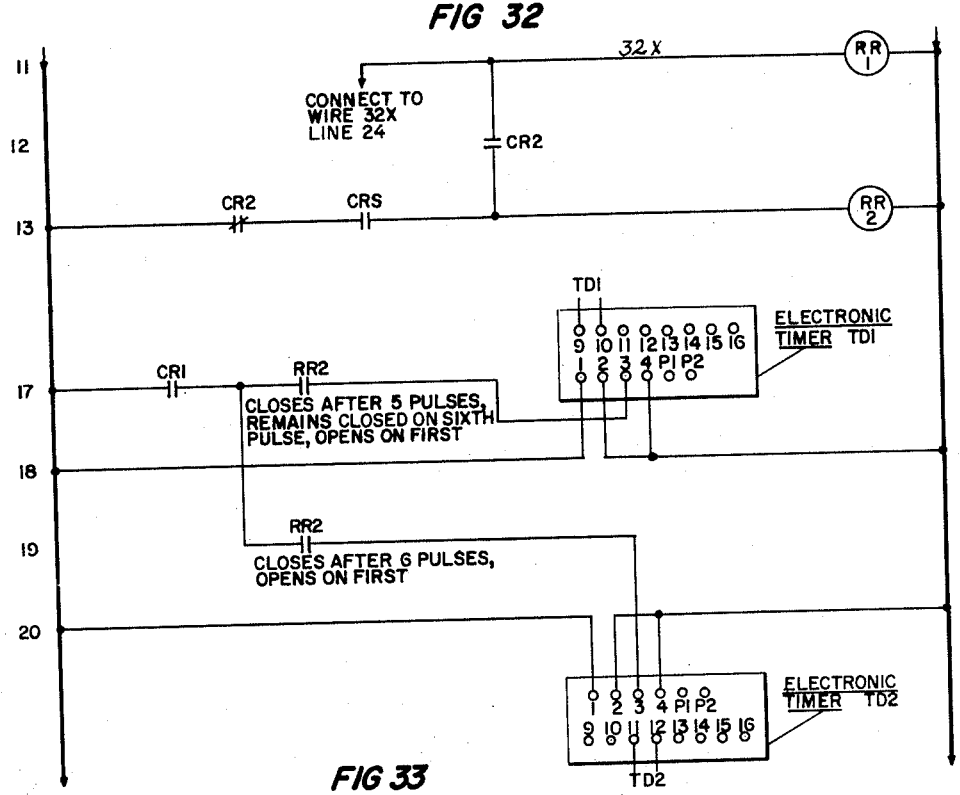
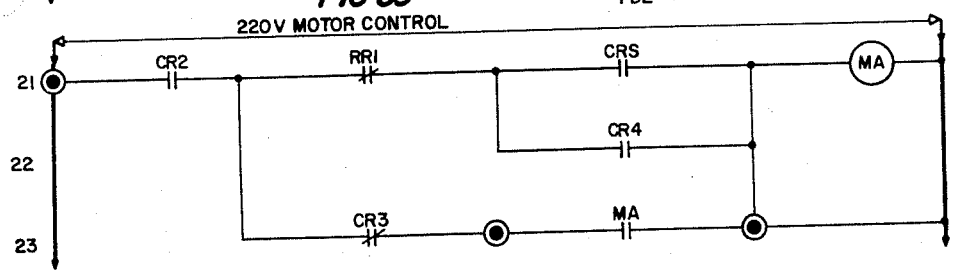
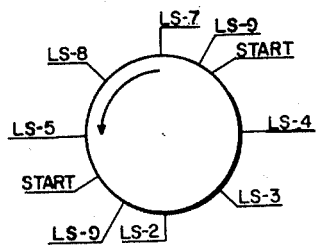
INVENTORS
Mark F. Gouran
Clyde A. Cobb
Leon Kazan
by *Wenderoth, Lind & Ponack*
ATTORNEYS July 13, 1965　　　M. F. GOURAN ETAL　　　3,194,942
AUTOMATIC RELAY WELDING MACHINE
Filed Sept. 19, 1961　　　　　　　　　　　15 Sheets-Sheet 14
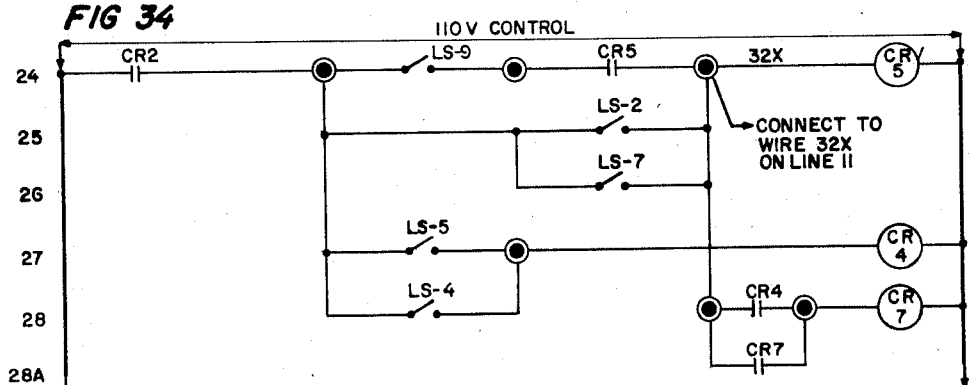
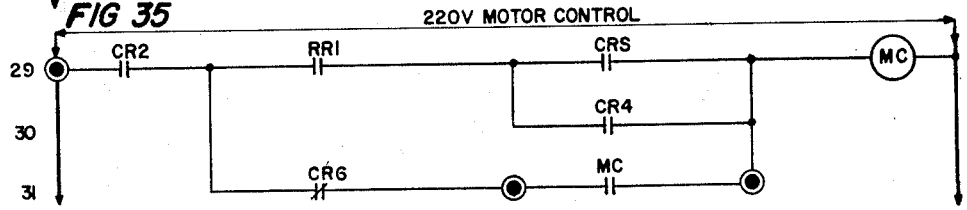
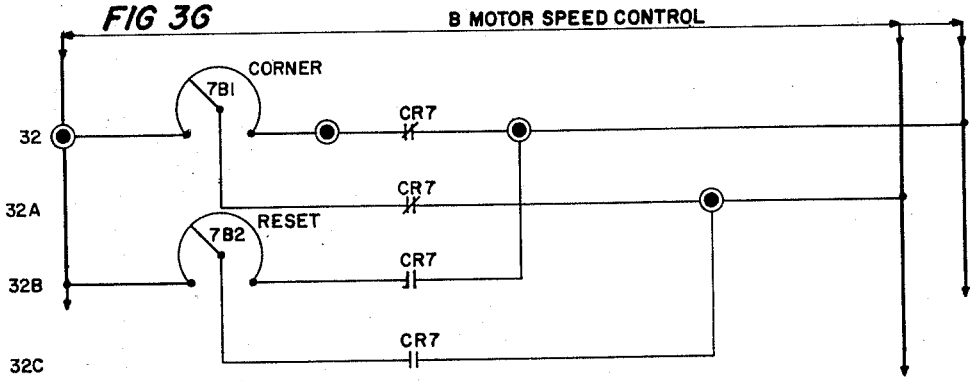
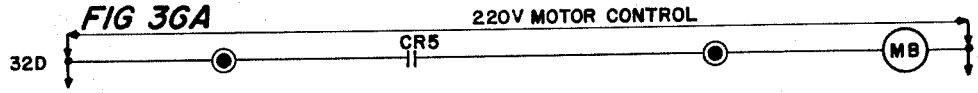
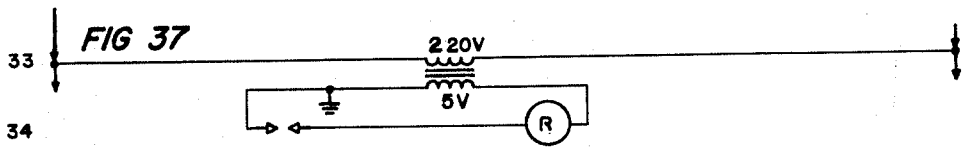
INVENTORS
*Mark F. Gouran*
*Clyde A. Cobb*
*Leon Kazan*
by *Wenderoth, Lind & Ponack*
ATTORNEYS

United States Patent Office 3,194,942
Patented July 13, 1965

3,194,942
AUTOMATIC RELAY WELDING MACHINE
Mark F. Gouran, North Hills, Clyde A. Cobb, Feasterville, and Leon Kazan, Philadelphia, Pa., assignors to Mark F. Gouran Co., Glenside, Pa.
Filed Sept. 19, 1961, Ser. No. 139,583
20 Claims. (Cl. 219—124)

This invention relates to a welding device particularly designed for cases which contain various electronic elements such as relays, filters, crystals, resistances, etc., and which should be hermetically sealed.

An object of the invention is to automatically and efficiently weld the header to the cover or case containing such plurality of electronic elements without damaging such elements by heat or changing the electrical characteristics of the elements in the case.

A further object of the invention is to provide a structure wherein the extent of the arc between the tungsten electrode and the article being welded may be easily and quickly adjusted.

An additional object is to provide a structure wherein a system of slides or shuttles are used to obtain rectilinear and circular motion of the work piece with respect to the welding point.

A further object is to provide an automatic structure wherein various structural configurations may be welded such as rectangles, squares, circles, oblongs, etc.

A still further object is to provide a structure wherein welding may be performed in a plane on regularly shaped geometric forms such as rectangles, squares, hexagons, etc. which combines straight sides and small radii at the corners.

Still another object of the invention is to provide a system of movement whereby the heat sinks may be accurately adjusted for various irregular shapes to secure a uniform volume of heat at the welding places by bringing the heat sink into immediate contact with the work piece for carrying away and dissipating the heat.

A further object of the invention is to provide means for holding the welding torch at a certain fixed position relative to the place to be welded and also to provide means for accurately adjusting the distance of the electrode from such place.

A still further object of the invention is to provide means whereby the torch may be quickly moved away from its working position to permit new work pieces to be placed in position.

A still further object of the invention is to provide means whereby a work piece may be moved rectilinearly and along a curved path consecutively.

With the above and other objects in view which will become apparent from the detailed description below, a preferred embodiment of the invention is shown in the drawings in which:

FIGURE 3 is a cross-sectional view showing the cam shaft assembly with parts in elevation.

FIGURE 4 is a perspective view showing the cam for moving a rectangular work piece along the short sides.

FIGURE 5 is a perspective view of the cam for moving a rectangular work piece along the long sides.

FIGURE 6 is a perspective view with parts broken away and the bearings removed showing the main shaft and the associated Geneva gear.

FIGURE 11 is a plan view taken upon section line 11—11 of FIGURE 8 showing the slides or shuttles and indicating how they are associated with the Geneva gear which is not shown in FIGURE 8.

FIGURE 12 is a sectional view taken upon section line 12—12 of FIGURE 11 looking in the direction of the arrows.

FIGURE 13 is a schematic plan view of a work piece at the stage of the operation represented by the position of the slides in FIGURE 11.

FIGURE 14 is a view similar to FIGURE 11 with the parts in a different position.

FIGURE 15 is a sectional view taken upon section line 15—15 of FIGURE 14 looking in the direction of the arrows.

FIGURE 16 is a view of the work piece shown in FIGURE 13 after the operation indicated by FIGURE 14 has been completed.

FIGURE 17 is a view similar to FIGURE 11 with the working parts in still another position.

FIGURE 18 is a sectional view taken upon section line 18—18 of FIGURE 17.

FIGURE 19 is a view of the work piece of FIGURE 13 showing the work completed thereon after the parts have reached the position shown in FIGURE 17.

FIGURE 20 is a similar view to FIGURE 11 showing the parts in still another working position.

FIGURE 21 is a sectional view taken upon section line 21—21 of FIGURE 20.

FIGURE 22 is a view of the work piece of FIGURE 13 showing the work accomplished after the parts have reached the position shown in FIGURE 20.

FIGURE 26 is a side elevational view of the torch, the chuck and the slide carrying the torch.

FIGURE 27 is a cross-sectional view taken upon section line 27—27 of FIGURE 26 looking in the direction of the arrows.

FIGURE 28 is a view indicated by section line 28—28 of FIGURE 26 looking in the direction of the arrows.

FIGURE 31 is a diagram of a portion of the control circuits.

FIGURE 32 is a continuation of the circuits shown in FIGURE 31.

FIGURE 33 is a diagram of a further control circuit.

FIGURE 34 is a continuation of the circuits shown in FIGURE 32.

FIGURE 35 is a continuation of the circuits shown in FIGURE 33.

FIGURE 36 is a further diagram of the control circuits.

FIGURE 36A is a further diagram of the control circuits.

FIGURE 37 is a still further diagram of the control circuits.

FIGURE 39 is a diagram showing the order of operation of the limit switches.

Figure 25:
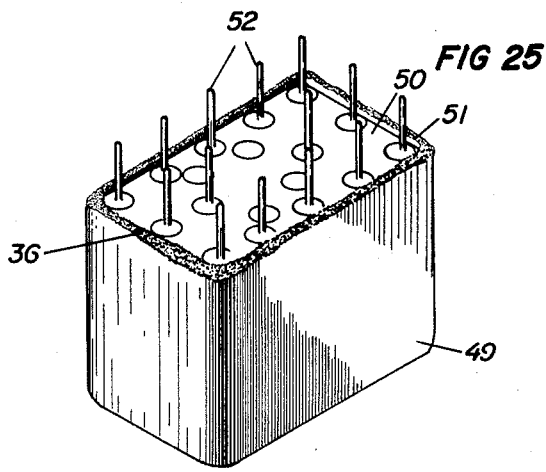
FIGURE 25 is a perspective view of one form of work piece completely welded to form a hermetic seal between case and header.
Figure 30:
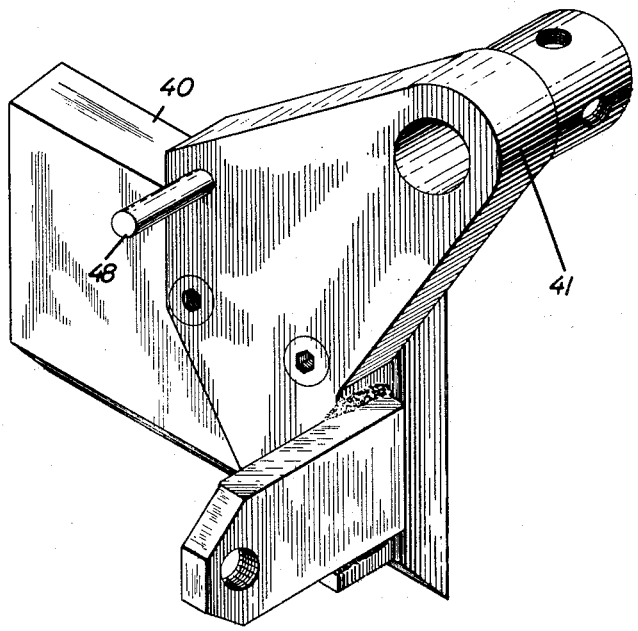
FIGURE 30 is a perspective view of two elements in the slide mechanism.

The case containing the electronic elements is shown at 49 in FIGURE 25 together with the header 50 whose rims are to be welded together as indicated at 51. The contacts extending to the electronic elements within the case 49 are shown at 52. In this figure the tail slope is indicated at 36 where the weld overlaps.

As a rule, any type of welding apparatus may be used but the tungsten inert gas welding process has been found to be most suitable. Also the case 49 and the header 50 may be of any suitable material such as steel, cupro-nickel or any weldable materials.

The workpiece is shown as rectangular with a long side and a short side which have at the corners arcs. However, any desired configuration may be used which would only require slight adjustments in the apparatus described below.

Broadly the invention comprises the application of the welding arc at one point and the movement of the work piece itself past such point so as to secure first the welding of a short side, then the welding of a corner, then the welding of a long side, and then another corner. This operation is repeated until the entire rim has been welded. It also involves the quick and accurate positioning of the case in the work holder so that an efficient operation is insured at all times with high rate of production of welded assemblies.

Figure 1:
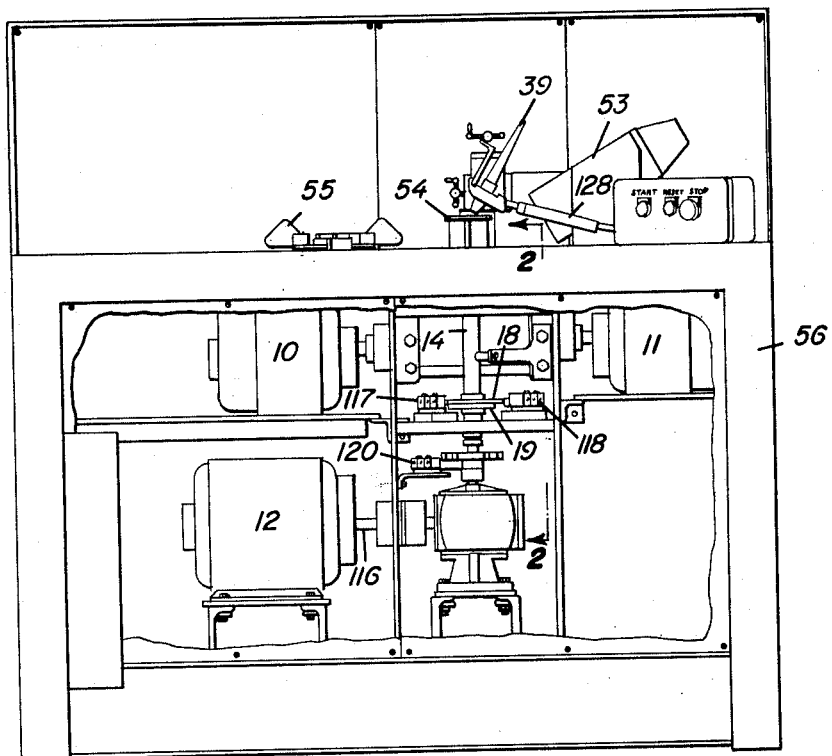
FIGURE 1 is a front view with parts broken away showing the entire apparatus.
Figure 2:
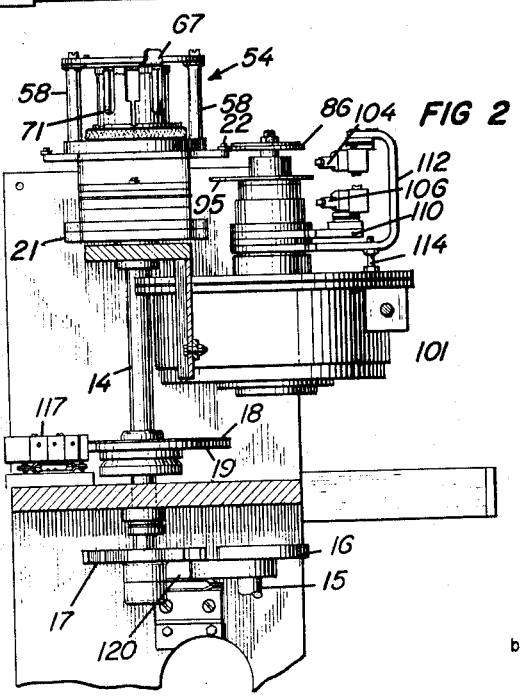
FIGURE 2 is an enlarged cross-sectional view taken upon section line 2—2 of FIGURE 1.

Referring to FIGURE 1, the torch is shown at 39, the mechanism for moving the torch towards the work piece and away from the workpiece is shown generally at 53. The work holder is indicated generally at 54 and at 55 there is a vise for holding a second chuck and loading the same while the work piece in the work holder 54 below the torch 39 is being operated upon.

The motor 11 operates the parts for accomplishing the welding along a long side while the motor 10 operates the parts for welding the short side. The motor 12 moves the workpiece past the torch to weld the corners. The motors 10, 11 and 12 are variable speed direct current motors wherein electronic tube means are provided for starting and stopping the motors and controlling their speeds.

The main shaft for rotating the work holder 54 is 14 and 56 indicates the frame of the machine.

*The work holder*

Figure 7:
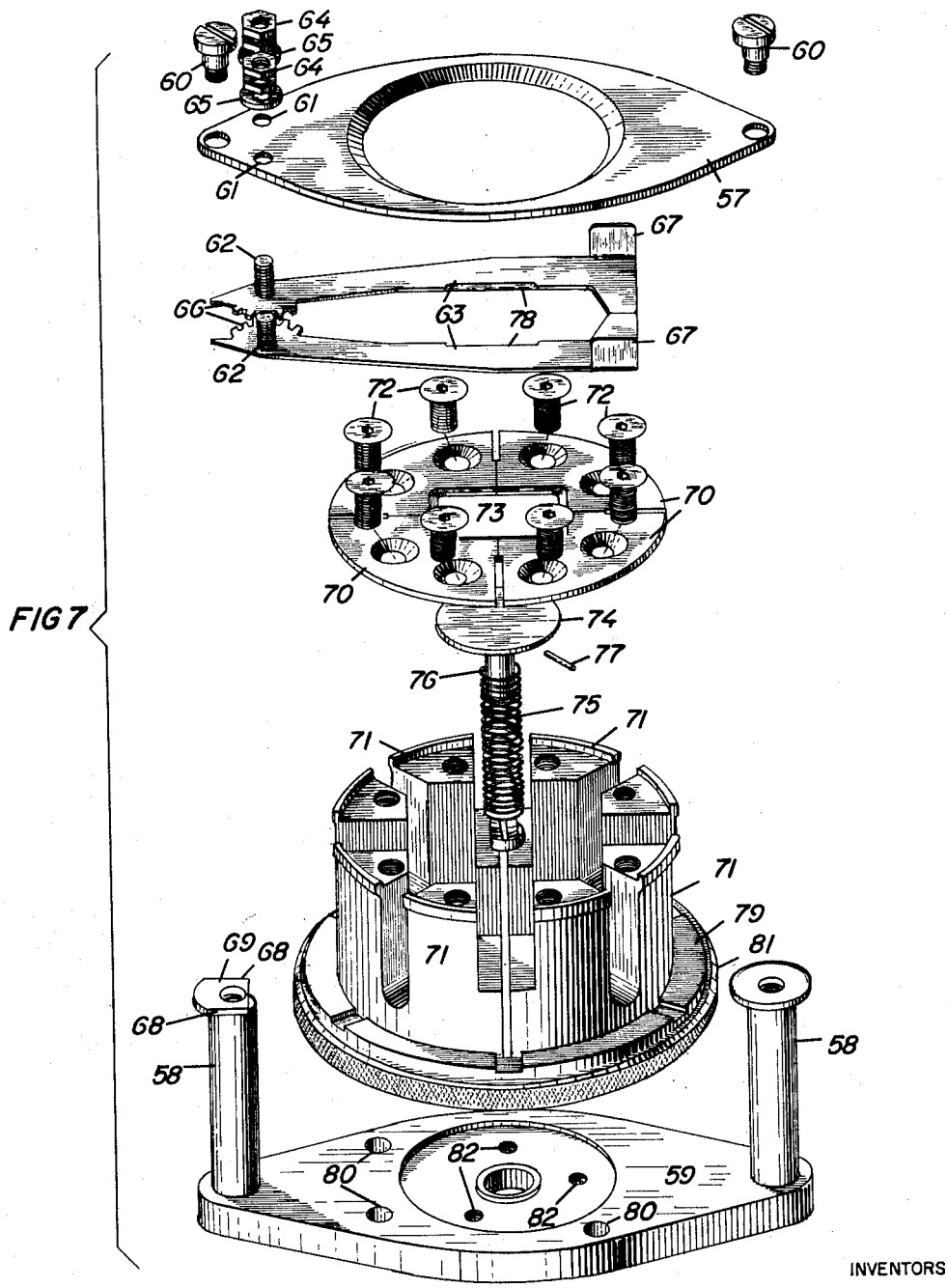
FIGURE 7 is an exploded perspective view showing the work holding assembly.
Figure 8:
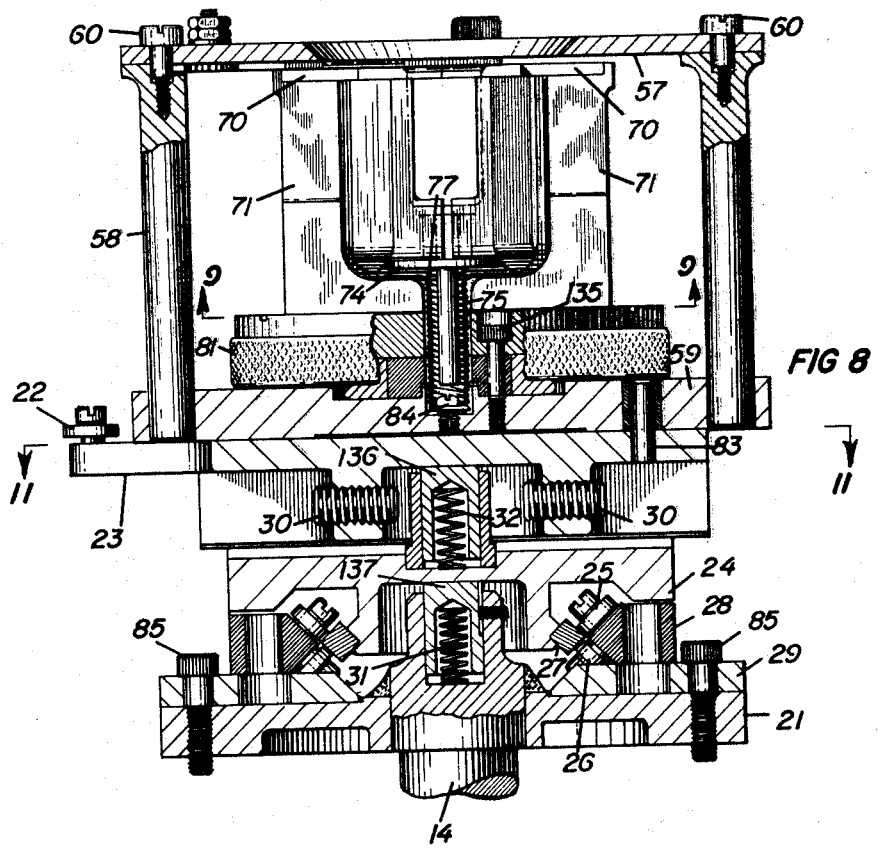
FIGURE 8 is a partial cross-sectional view with parts in elevation showing the connections of the main shaft, the slides or shuttles and the work holding assembly.

The work holder 54 is disclosed in FIGURE 7 in an exploded view and in FIGURE 8 in assembled and installed position. It comprises a cover plate 57 which is secured when in assembled condition to the posts 58 upon the base plate 59 by means of the bolts 60. The cover plate 57 is also provided with two holes 61 located at one side of the cover plate through which extends the studs 62 upon the gauging plates 63 and are secured in position by the nuts 64 and the cooperating washers 65.

The gauging plates 63 are provided with intermeshing gear segments 66 adjacent the posts 62 so that when one gauging plate is moved outwardly the other will also be moved. Handles 67 are provided upon the gauging plates which extend above the cover plate 57 so that such plates may be easily separated or brought together. One of the posts 58 is provided with flat surfaces 68 upon a disc 69 at the top thereof to serve as stop means for the outward swing of the gauging plates. Below the gauging plates are the heat sinks 70 preferably of copper and they are four in number and are secured to the four segments 71 of the chuck by the bolts 72. The heat sinks 70 are cut away at the center to provide a rectangular opening 73 approximating loosely the configuration of the workpiece.

A platform 74 urged upwardly by a spring 75 is provided for the workpiece. The spring 75 is connected to a stem 76 upon the platform by means of a pin 77. When the gauging plates 63 are in closed postion as shown in FIGURE 7 then the platform 74 and cooperating spring 75 will bring pressure to force the workpiece against the gauging plates prior to securing the workpiece in the chuck. In this way the workpiece is always maintained at a predetermined height until the chuck is tightened thereon. The gauging plates therefore as well as the cooperating table 74 always position the workpiece in exactly the right position. The gauging plates are also provided with recesses 78 for clearance around wires 52 of FIGURE 25 upon the workpiece.

Figure 9:
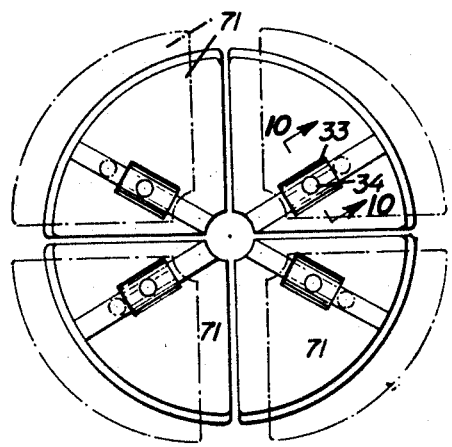
FIGURE 9 is a cross-sectional view taken upon section line 9—9 of FIGURE 8 looking in the direction of the arrows.
Figure 10:
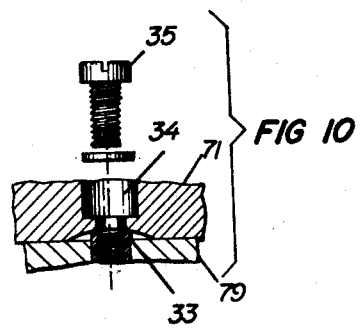
FIGURE 10 is an enlarged exploded cross-sectional view upon section line 10—10 of FIGURE 9 looking in the direction of the arrows.

The chuck with the four segments 71 is a modified conventional six segmented chuck with the grooves radially spaced at 60°. The four segments 71 are adapted to such a six segmented chuck by cutting the lands therein at 60° and 120° to one another as shown in FIGURE 9 to accommodate rectangularly shaped workpieces. However the chuck may be varied as desired when other configurations of workpieces are used. The lands are used to align the work holder to any four radially opposed segments of the chuck. Arcuate portions 33 are made in the lands through which holes 34 are bored. The segments 71 are fastened by bolts 35 (FIGURE 10) to the usual radially movable parts not shown of the chuck. The segments 71 slide radially on the surface of 79, being driven by the movable parts referred to above the keyway. See FIGURES 9 and 10. The bolts 135 in FIGURE 8 join the chuck to the base 59. FIGURE 9 shows in dot and dash lines the open position of the chuck and indicating that the radial movement of the four segments is not equal in all directions. It shows that the movement takes place more along the long side of the work piece than along the short side. Conversely when it is closed there is more movement along the long side than there is along the short side which is due to the spacing of the lands and the screw holes of the work holding assembly.

The base 59 of the work holder is provided with three dowel holes 80 irregularly arranged for a purpose later to be described. The knurled ring 81 operates the chuck in the usual way. The chuck body 79 is secured to the base plate 59 by the bolts 135 screwing into the threaded holes 82. The lower end of the spring 75 is secured to the base plate 59 by the bolt 84.

The base plate 59 is provided with the holes 80 to accommodate the three dowel pins 83 of which one is shown in FIGURE 8. The irregular arrangement of dowel pins 83 and mating holes 80 is to provide an unique joint so that the machine operator cannot mis-match parts nor install the work holder incorrectly.

*Means for securing rectilinear motion*

The dowel pins 83 are fixed upon the upper surface slide or shuttle 23. At opposite sides of the slide 23 are fixed the cam follower rollers 22 which react with the cams to be described below. The slide 23 rolls upon a track similar to the track 27 for the slide 24 located below the slide 23. Cooperating with such track also are rollers similar to the rollers 25 and 26 shown in FIGURE 8 running upon the track or wear piece 27. The bolts 30 are adjustable elements for adjusting the throw of the slide 23.

The slide 24 is mounted so as to slide at right angles when a rectangular work piece is being welded to the movement of the slide 23 and the slide 24 is also provided with cam follower rollers 22'.

The slide 24 is also provided with adjustment bolts similar to the bolts 30. The lower plate 29 to which the plate 28 is fixed carrying the rollers 25 and 26 for the wear piece or track 27 is fixed to a plate 21 which in turn is fixed to the main shaft 14. The bolts 85 secure the plates 29 and 21 together.

The means for moving the slides 23 and 24 is shown particularly in FIGURES 3, 4 and 5. Cooperating with the cam follower rollers 22 upon the slide 23 is a cam 86 fixed to the cam shaft 87 by the nut 88. The cam shaft 87 has fixed to it a worm gear 89 which is driven by a worm pinion 90 fixed upon a shaft 91 which is driven by the motor 10. The shaft 87 is mounted on roller bearings 92 and 93. Concentric with the shaft 87 is a hollow cam shaft 94 which drives the cam 95 which cooperates with the cam follower rollers 22' upon the slide 24. Fixed to the hollow shaft 94 is a worm gear 96 driven by a worm pinion 97 which in turn is fixed to a shaft 98 which is driven by the motor 11. The shaft 94 is also mounted in roller bearings 99 and 100. The gears 96 and 89 and cooperating parts are located in a tank 101 containing oil 102.

Depending from the cam 86 is a cam lug 103 which upon rotation will cooperate with various limit switches such as 104 shown in FIGURE 3.

The cam 95 which controls the long travel of the slide 24 is also provided with a depending lug 105 which cooperates with various limit switches in its rotary travel such as 106 in FIGURE 3.

The tank 101 is provided with a cover plate 107 provided with an oil refill plug 108 and having an upwardly extending hollow stem 109 upon which are mounted the brackets 110, 111, 112 and 113 which support the various limit switches such as 104 and 106 controlling the sequential operation of the cams 86 and 95. Each bracket such as 112 is supported by a bolt such as 114. The brackets 110, 111, 112 and 113 are held in place on the cover plate extension 190 by U-shaped collars and are moved against frictional resistance to adjust their positions. In order to drain the tank 101 an outlet plug 115 is provided. There are four limit switches cooperating with the cams 86 and 95. Two of such switches are for starting the motor 12 in FIGURE 1 and two for stopping the cams 86 and 95.

In the control circuits which will be described below the limit switch 104 upon bracket 112 is LS-7 for operating the cornering motor. Also the limit switch 106 upon bracket 110 is LS-2. This also operates the cornering motor. The limit switch upon bracket 111 is LS-3 for stopping the long travel cam drive and the limit switch upon bracket 113 is LS-8 for stopping the short travel cam drive.

*Means for securing circular movement*

Referring to FIGURES 1 and 6, the motor 12 drives the shaft 116 and such shaft through a transmission rotates the vertical shaft 15 which has fixed to it the male Geneva gear 16. The female Geneva gear 17 is fixed to the shaft 14 and such shaft is fixed to the slides and shuttle construction which in turn carries the work piece holder by means of the plate 21. A rotation of the main shaft 15 therefore will also bring about a rotation of the slides 23 and 24 as well as a rotation of the workpiece holder assembly.

The shaft 14 also carries the cam plates 18 and 19 which may be adjusted accurately by the bolt and nut 20 with relation to one another and with the shaft 14. Cooperating with the cam plates 18 and 19 are the limit switches 117 and 118 shown in FIGURE 1 and cooperating with the stud 119 upon the male Geneva gear is the limit switch 120. The limit switches 117 and 118 are in the control circuits below as the limit switches LS-4 and LS-5. The limit switch 120 is LS-9. The rotation of the shaft 14 for welding the corners of the work piece is accomplished by the shaft 15 through the Geneva gear. A rotation of 90° is accomplished at each corner. The corners generally have a very small radius; about .040 inch.

When the Geneva gear assembly has made a 90° rotation it throws a switch by means of the cams 18 and 19 which rotate with the shaft 14 so as to set in motion the slide or shuttle which is to take care of the next rectilinear side of the work piece. At the termination of this rectilinear motion the cam 86 or 95 will throw a switch to again set in motion the Geneva drive to take care of the next circular corner. This procedure is repeated successively for the other two sides of a rectangular work piece.

When the four sides and corners have been welded then the apparatus is continued so as to weld a small additional portion constituting an overlap. When this overlap portion of the weld is almost completed, timing relay TD1 sets in motion a series of reductions of welding current which reductions constitute tail slope and provide a smooth finish to the welding cycle. Then the electrical controls stop the arc and the machine continues to operate mechanically as previously described for one more side and one more corner. It then stops and the torch retracts upwardly out of the way as described below and the operator may now remove and replace the work piece with a new one.

There are provided variable speed controls with respect to the various motors so that the speed of the various elements may take place at the most efficient speed for welding.

The three motors are so controlled as to provide a constant rate of speed for welding. The speed selected is also the optimum welding speed.

A prime feature of the machine is that speed or rate of linear travel does not have any adverse affect upon the machine's ability to follow through the squence of operations. *This is due to the fact that each motion must be completed (and signalled by the operation of a limit switch) before the next motion may begin. No cumulative error* can creep into the operation. Indeed, it is possible to operate the three motors in such a way as to have three different linear speeds (i.e. short travel, long travel and cornering), without disturbing the sequence of operations.

*The welding torch*

In FIGURES 26 to 30 inclusive the construction of the torch carrier is shown as well as its movements relative to the work holder and work piece. A standard 37 is mounted upon the frame 56 and a track 38 is secured thereto by means of the bolts 121. The torch 39 is attached to a sliding element 40 as shown in FIGURE 27 by means of a conventional microadjustment for the position of the torch 39 and a micro-adjustment holder 41.

In FIGURE 27 there is shown a wear plate 42 with a tensioning screw 43. FIGURE 28 shows in greater detail the conventional micro-adjusting means used. At 122 there is a limit switch referred to as LS-1 in the control circuits below and the air cylinder for moving the torch along the slide is 44. A brake 45 and a plate 46 support the air cylinder 44 and hold it rigidly against the track 38 by means of the screws 47.

A pin 48 is fixed in the micro adjustment holder 41 and when the torch reaches its welding position and approaches the workpiece the pin 48 will trip the limit switch 122 to starting the welding arc.

Figure 29:
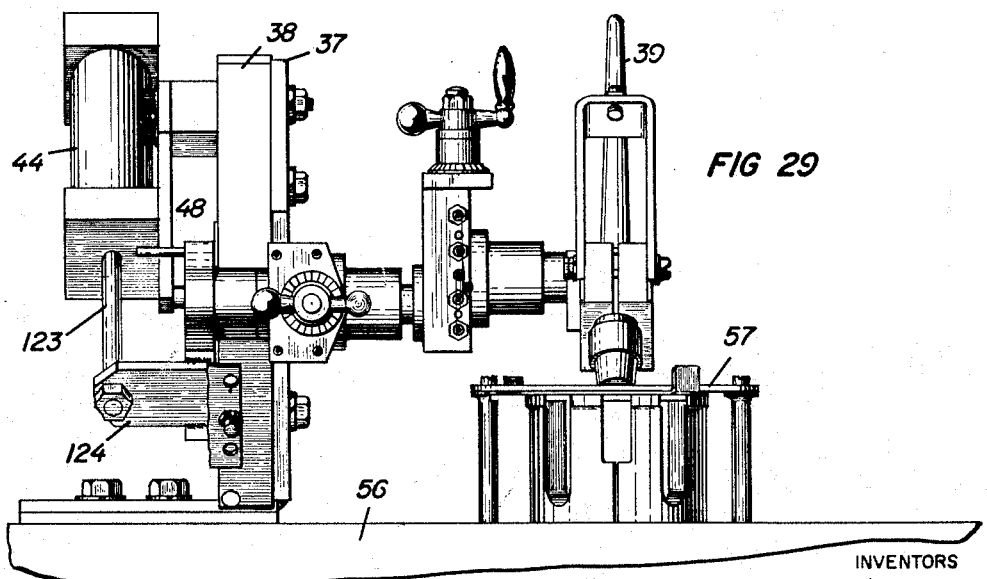
FIGURE 29 is a sectional view taken upon section line 29—29 of FIGURE 26.
Figure 38:
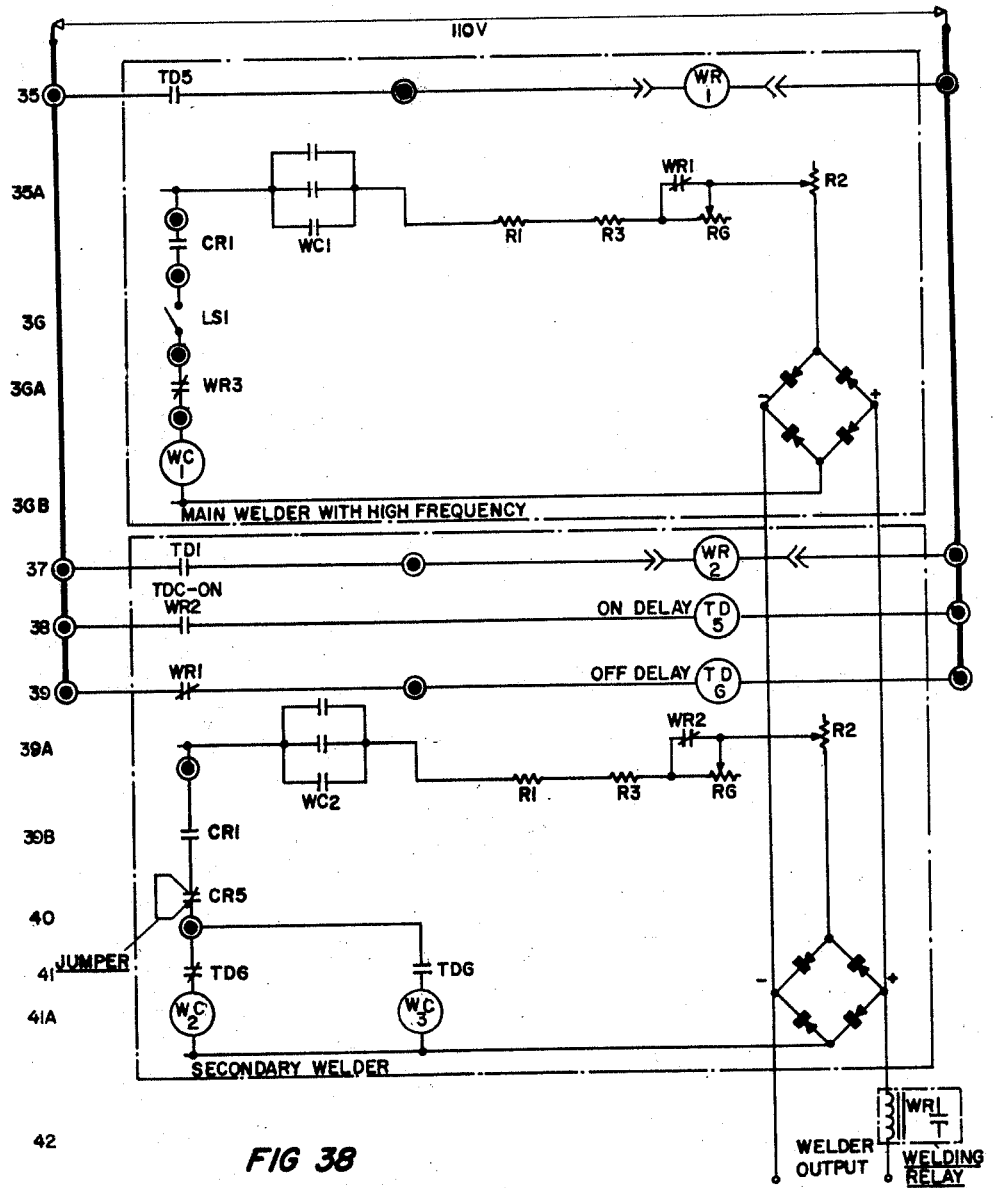
FIGURE 38 is a still further diagram of the control circuits.

In FIGURE 29 the limit switch 122 has been omitted in order to show more clearly the elements for causing the movements of the torch to and from the work piece. The piston rod 123 of the piston movable in the cylinder 44 is connected to the plate 124 and brings about the movements of the torch.

The electrode of the torch wears slowly during use and means are provided in the controls for the torch to be manually adjusted and reset when required so as to maintain the arc length at .012 inch which is the most suitable but the arc length may vary slightly either above or below this figure.

*The operation*

The operation of the machine is shown particularly in FIGURES 11 through 24. In these figures the work holder is removed. The starting point for welding a work piece is always a short distance along a straight side, relative to the last corner.

FIGURE 11 shows the starting point for welding a workpiece beginning at 124 as shown in FIGURE 13. The male and female Geneva gears are still. As shown in FIGURE 12 the slide 23 is located eccentrically to the main shaft 14. FIGURE 12 also shows that the slide 24 is not eccentric with respect to the main shaft. This is the start of welding a part of the first straight side.

In FIGURE 14 the slide 23 has been moved downwardly by the action of the cam 86 upon the cam follower roller 22 at the upper end thereof. This has caused the workpiece to travel past the electrode at a short side. In FIGURE 15 the slide 23 has been moved relative to the shaft 14. At the end of this operation the weld extends from the middle of a short side to the end of that short side as shown at 125 in FIGURE 16.

In FIGURE 14, the male Geneva gear is about to start engaging the female Geneva gear to rotate the same clockwise. In FIGURE 17 the step started in FIGURE 14 has been completed and the main shaft 14 has been rotated 90 degrees to accomplish the welding of a corner as shown at 126 in FIGURE 19. It will be noted that the slides 23 and 24 have been rotated 90 degrees but their relative positions have not been changed with respect to main shaft 14.

It is now time for the machine to weld a long side. In FIGURE 17 and the slide 24 is ready to move and in FIGURE 20 the slide 24 has been moved downwardly by the action of the cam 95 upon the cam follower roller 22' at the upper end thereof. This has caused the workpiece to travel past the electrode at a long side. In FIGURE 21 the slide 24 has been moved relative to the shaft 14. FIGURE 22 now shows at 127 the extent of the weld now completed.

Figure 23:
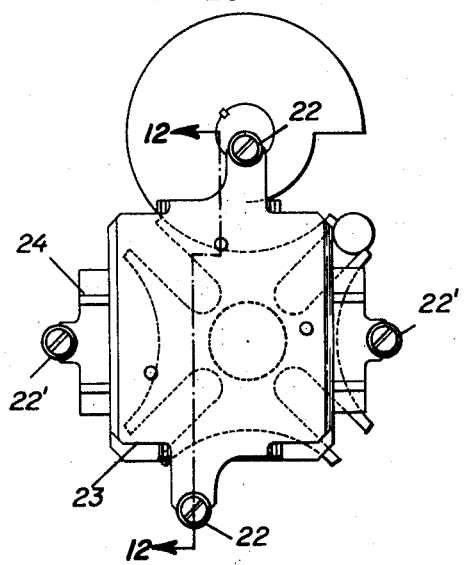
FIGURE 23 is a view similar to FIGURE 11 with the parts in still another working position.

It is now time for the second corner to be welded. In FIGURE 20 the male Geneva gear is about to start engaging the female Geneva gear to move it clockwise. In FIGURE 23 the step started in FIGURE 20 has been completed and the main shaft has been rotated 90 degrees to accomplish the welding of the second corner. The extent of completed weld is shown at 129 in FIGURE 24. It will be noted that slides 23 and 24 have been rotated 90 degrees but their relative positions have not been changed with respect to main shaft 14.

It is now time for the machine to weld the second short side. In FIGURE 23 the side 23 is ready to pushed downwardly by the action of cam 86 upon the cam follower rollers 22 at the upper end thereof. This will cause the workpiece to travel past the workpiece at a short side. Part way along this short side a position will be reached which is identical to that shown in FIGURES 11 through 13 except for the 180 degree rotation of the workpiece. The extent of completed weld is shown at 130 in FIGURE 24A.

By comparing FIGURES 11 and 23 such figures are similar but the dowel positions are rotated 180°. The dowels 83 carry the workholder and therefore the work or welding is half completed. The dowels 83 which fit into the work holding assembly are not equally spaced in order to insure correct positioning of the work holder particularly for the beginning of the action. This insures the correct starting of the welding operation.

Figure 24:
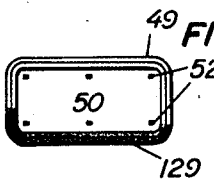
FIGURE 24 is a view of the work piece of FIGURE 13 showing the work accomplished after the movement of the parts to the position shown in FIGURE 23.
Figure 24A:
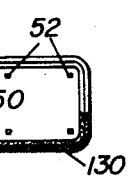
FIGURE 24A is a view of the work piece of FIGURE 13 showing the welding accomplished after one cycle of the machine.

Therefore in order to complete the operation around the remaining portion not welded shown in FIGURE 24A the above cycle of operations is repeated in its entirety.

When the above described operation has been completed and the workpiece has been completely welded the operation of the machine is continued thereby causing a small portion of previously welded material to be rewelded. This overlap weld assures the integrity of the weld. When this small amount of overlap weld is completed the welding current is reduced (tailslope) and stopped completely while the machine continues to move mechanically as described above until the short side, the following corner and a short part of the following long side have passed beneath the electrode. At this point the machine stops and the torch is withdrawn.

The springs 31 and 32 acting upon copper slugs 137 and 136 respectively maintain the slides or shuttles 23 and 24 in tight frictional contact so that any movement imparted to the slides 23 or 24 is positive and accurately controlled. The elements 136 and 137 also are part of the electrical ground in weld circuit. They also serve as frictional brakes as above described.

The electrode at the arc gradually wears and therefore means are provided for securing an accurate length of the arc. The inert gas is provided through the tube 128. The welding apparatus itself however may be changed to any other type of welding with appropriate modifications and limitations.

The control circuits

The control circuits for operating the above elements are shown in FIGURES 31 to 39 inclusive.

The automatic operation takes place by accomplishing the following steps:

(A) The 110-volt control circuit is energized.

(B) The 220-volt power switches are closed to the three electronic tube controlled motors for starting and stopping.

(C) The 220-volt power switches for the two welding power sources are closed.

The start of the operation takes place as follows:

In FIGURES 31 to 38 inclusive the lines are numbered from 1 to 42 and these lines will be referred to in the following description. In line 2, the automatic start push button is pressed to close the circuit and this energizes the relay CRS. The relay CRS with a normally open contact in line 2A closes to energize the relay CR1 in line 3. The relay CR1 in line 3 with a normally open contact seals in the relay CR1.

The relay CR1 with a normally open contact in line 5B closes and energizes the air solenoid valve SV in line 5B for advancing the electrode holder 40 into the welding position.

In line 13, the relay CRS with a normally open contact closes and energizes the ratchet relay RR2 which advances one step. The relay CRS with normally open contacts close the circuits for the long and short travel motors 10 and 11 respectively as shown in lines 21 and 29.

The relay CR1 with normally open contacts closes to permit the following sequence of operations which establish the control circuits.

The relay CR2 in line 6 closes.

The time delay relays TD1 in line 17 and TD2 in line 20 close.

The primary welding control circuit in line 36 closes.

The secondary welding control circuit in line 39b closes.

The welding torch 39 now advances to the welding position and the welding current is held off by the limit switch LS–1 in line 36 until the welding torch reaches its welding position. The high frequency arc jumps to the work causing the welding current to flow.

The welding current is detected by the relay WR in line 42. The relay WR with normally open contacts in line 7 closes and energizes the relay CR2 line 6 which seals in. Relay CR2 whose contacts are normally open closes in line 7 and energizes the relay CR2A.

The relay CR2A in line 2 whose contacts are normally closed opens to deenergize relay CRS. The relay CR2 whose contacts are normally open close the long travel, cornering, and short travel circuits for the electronic tube controlled motors 10, 12 and 11 respectively in lines 21, 24 and 29. The motor circuits are thus established.

The contacts of the relay CR2 normally closed in line 13 opens to reset the relay RR2. The relay CR2 whose contacts are normally open in line 12 closes to connect in parallel the two ratchet relays RR1 in line 11 and RR2 in line 13.

The relay RR1 determines the long or short travel motor operation. It is assumed that the relay RR1 in line 21 has its contacts closed in the long travel circuit. When the relay CR2 closes the long travel contactor in line 21 will be energized closing the contact MA in line 23 and thereby sealing itself in. This happens before the relay CRS has been deenergized.

The long travelling electronic tube controlled motor 11 now starts. The long travel motion continues until the limit switch LS-2 in line 25 is struck. The relay CR5 in line 24 is energized and seals itself in. The relay CR5 with normally open contacts closes in line 32D and energizes the cornering contactor MB starting the cornering motor 12.

When the relay CR5 is energized the relay RR1 and RR2 are energized and index one step. The long travel motor 11 continues to reset itself until the limit switch LS-3 in line 9 is struck thereby energizing relay CR3 which opens its normally closed contacts in line 23 to deenergize the long travel motor contactor MA thereby stopping the motor 11.

The limit switch LS-4 in line 28 is struck as the corner is completed thereby energizing the relay CR4 in line 27.

The normally open contacts of relay CR4 in line 28 closes to energize relay CR7 in the same line. The normally open contacts of relay CR4 also close in lines 22 and 30 in the long and short travel motor circuits.

Since the relay RR1 indexed when the relay CR5 was energized, the normally closed contact in line 21 is now open and the normally open contact in line 29 is now closed. A circuit is now completed in lines 29 and 30 to energize the short travel motor contactor MC which seals itself in by closing the contact MC in line 31 thereby starting the motor 10.

When the relay CR7 is energized and sealed in lines 28 and 28A the normal speed cornering potentiometer is cut out and the reset speed potentiometer is inserted into the cornering motor control circuit as indicated in lines 32, 32A, 32B and 32C.

When the cornering operation is completed the limit switch LS-9 in line 24 is struck thereby deenergizing the relay CR5 in line 24 and the relay CR7 in line 28 stopping the reset cornering motion and restoring the normal speed cornering potentiometer to the cornering motor 12 control circuit.

The short travel continues until the limit switch LS-7 in line 26 is struck which again starts the cornering control motor 12. The short travel motor 10 continues until LS-8 in line 10 is struck thereby energizing relay CR6 which opens a normally closed contact in line 31 to stop the short travel motor 10.

The cornering motion continues until limit switch LS-5 in line 27 is struck causing the long travel motor 11 to start and increasing the cornering speed. The cornering stops when the limit switch LS-9 in line 24 is struck.

The above description covers one half of the total weld cycle. To complete the weld cycle, the above description is repeated from the start of the long travel to the above point and then continues as below.

When the relay RR2 has indexed five times (starting impulse plus four corners), one of its contacts closes energizing time delay relay TD1 in line 17. After a time delay a normally open contact of TD1 closes to energize relay WR2 in line 37. The normally closed contacts of relay WR2 in line 39A open to insert a resistance into the secondary weld circuit to reduce the welding current. This is the first step of four steps to be taken in removing the welding current and stopping the arc.

The normally open contact of relay WR2 in line 38 closes to energize the time delay relay TD5. When its time expires TD5 closes to energize WR1 in line 35. The relay WR1 with normally closed contact opens to add resistance to the primary welder circuit (line 35A). This is the second stage of the current reduction. The normally closed contact of relay WR1 in line 39 opens to deenergize the time delay relay TD6 in line 39. The relay TD6 with normally closed contact in line 41 opens to deenergize welding contactor WC2 in line 41A which opens the secondary welder circuit. The normally open contact of relay TD6 in line 41 closes to energize relay WR3 in line 41A. When the relay WR3 is energized the normally closed contact of WR3 in line 36A opens to deenergize the primary welding contactor WC1 in line 36B which cuts off the primary welding current.

The machine continues to move.

When the fifth corner is reached the relay RR2 steps again closing the normally open contact of RR2 in line 12 to energize the time delay relay TD2 in line 20. When the timing period expires the normally closed contact of relay TD2 in line 3 opens to deenergize the relay CR1 and end the cycle.

All the relays are now in their original positions and the welding torch 39 retracts as a pulse of current energizes the air solenoid valve SV in line 5D.

In order for the machine to perform all the mechanical functions as described above but without a welding current, the steps above set forth should be followed with the following changes:

The power switches for the two welding power sources mentioned above at C are not turned on.

Since there is no welding current available, limit switch LS-1 in line 36 and relay WR in line 7 serve no function. Therefore the relay WR in line 7 with normally open contacts is not closed and the relay CR2 is energized by pressing the button marked "Manual Start." Relay CR2 is energized and seals itself in in lines 6 and 8. The description above set forth is then proceeded with.

In FIGURE 39 the order of the operation of the various limit switches mentioned above is set forth. The motors 10, 11 and 12 have associated therewith the usual speed regulation devices.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

We claim:

1. An automatic welding machine comprising means for holding a workpiece to be welded, a welding torch, means for moving said torch towards and away from said workpiece, means for moving said holding means rectilinearly to move said workpiece past said torch at a predetermined distance therefrom, a first motor for driving said moving means rectilinearly, means for moving said holding means along an arc to move said workpiece past said torch at said predetermined distance, a second motor for driving said last named moving means along an arc, a second means for moving said holding means rectilinearly a distance different from the movement effected by said first mentioned rectilinear moving means, a third motor for driving said second means for moving said holding means rectilinearly and means controlling said various moving means for said workpiece to operate them sequentially, means controlling said motors to operate them sequentially, means synchronizing the movement of said torch with the movement of said various moving means and means for supplying a welding current to said torch.

2. An automatic welding machine comprising means for holding a workpiece to be welded, a welding torch, means for moving said holding means for said workpiece along a predetermined path comprising rectilinear and curved components at a predetermined distance from said torch, said moving means comprising a slide, means for moving said slide, a second slide movable at an angle to said first slide, means for moving said second slide and means for rotating said slides to secure said curved components.

3. An automatic welding machine comprising means for holding a workpiece to be welded, a welding torch, means for moving said holding means for said workpiece along a predetermined path comprising rectilinear and curved components at a predetermined distance from said torch, said moving means comprising a first slide upon which said means for holding a workpiece is detachably mounted, a cam shaft, a cam upon said shaft for moving said slide, means for driving said cam shaft, a second slide located at an angle to said first slide upon which said first slide is mounted, a second cam shaft, a cam upon said second cam shaft for moving said second slide, means for driving said second cam shaft, a main shaft upon which said slides are mounted and means for rotating said main shaft including a Geneva gear.

4. A workpiece support particularly for an automatic welding machine comprising a base, a chuck mounted on said base to clamp a workpiece, a cover plate located above said chuck having an opening through which a workpiece may be inserted to said chuck, a movable platform mounted in said chuck urged resiliently towards said cover plate upon which said workpiece is placed, and a gauging plate pivotally mounted below said cover plate to obstruct said opening during mounting of a workpiece on said platform to permit accurate positioning of said workpiece with respect to said cover plate during clamping by said chuck and then may be pivoted away from the operating area.

5. A workpiece support particularly for an automatic welding machine comprising a base, a chuck mounted on said base to clamp a workpiece, a cover plate located above said chuck having an opening through which a workpiece may be inserted to said chuck, a movable platform mounted in said chuck urged resiliently towards said cover plate upon which said workpiece is placed and a pair of cooperating gauging plates pivotally mounted below said cover plate to obstruct said opening during mounting of a workpiece on said platform to permit accurate positioning of said workpiece with respect to said cover plate during clamping by said chuck and then may be pivoted away from the operating area.

6. A workpiece support particularly for an automatic welding machine comprising a base, a chuck mounted on said base to clamp a workpiece, a cover plate located above said chuck having an opening through which a workpiece may be inserted to said chuck, a movable platform mounted in said chuck urged resiliently towards said cover plate upon which said workpiece is placed, a pair of cooperating gauging plates pivotally mounted below said cover plate to obstruct said opening during mounting of a workpiece on said platform to permit accurate positioning of said workpiece with respect to said cover plate during clamping by said chuck and then may be pivoted away from the operating area and a plurality of heat sinks mounted upon said chuck directly below said gauging plates.

7. A workpiece support particularly for an automatic welding machine comprising a base, a chuck mounted on said base to clamp a workpiece, a cover plate located above said chuck having an opening through which a workpiece may be inserted to said chuck, a movable platform mounted in said chuck urged resiliently towards said cover plate upon which said workpiece is placed, a gauging plate pivotally mounted below said cover plate to obstruct said opening during mounting of a workpiece on said platform to permit accurate positioning of said workpiece with respect to said cover plate during clamping by said chuck and then may be pivoted away from the operating area and means for reciprocating and rotating said base sequentially.

8. A workpiece support particularly for an automatic welding machine comprising a base, a chuck mounted on said base to clamp a workpiece, a cover plate located above said chuck having an opening through which a workpiece may be inserted to said chuck, a movable platform mounted in said chuck urged resiliently towards said cover plate upon which said workpiece is placed, a gauging plate pivotally mounted below said cover plate to obstruct said opening during mounting of a workpiece on said platform to permit accurate positioning of said workpiece with respect to said cover plate during clamping by said chuck and then may be pivoted away from the operating area and means for reciprocating and rotating said base sequentially and cyclically in individual, discrete steps.

9. A workpiece support particularly for an automatic welding machine comprising a base, a chuck mounted on said base to clamp a workpiece, a cover plate located above said chuck having an opening through which a workpiece may be inserted to said chuck, a movable platform mounted in said chuck urged resiliently towards said cover plate upon which said workpiece is placed, a pair of cooperating gauging plates pivotally mounted below said cover plate to obstruct said opening during mounting of a workpiece on said platform to permit accurate positioning of said workpiece with respect to said cover plate during clamping by said chuck and then may be pivoted away from the operating area and means for reciprocating and rotating said base sequentially.

10. A workpiece support particularly for an automatic welding machine comprising a base, a chuck mounted on said base to clamp a workpiece, a cover plate located above said chuck having an opening through which a workpiece may be inserted to said chuck, a movable platform mounted in said chuck urged resiliently towards said cover plate upon which said workpiece is placed, a pair of cooperating gauging plates pivotally mounted below said cover plate to obstruct said opening during mounting of a workpiece on said platform to permit accurate positioning of said workpiece with respect to said cover plate during clamping by said chuck and then may be pivoted away from the operating area and means for reciprocating and rotating said base sequentially and cyclically in individual discrete steps.

11. An automatic welding machine for welding a workpiece having a symmetrical shape with an even number of straight sides wherein the opposite sides are parallel and the arc shaped corners have radii which are constant and equal comprising means for holding said workpiece, a welding torch, means for moving said holding means with said workpiece in a fixed plane past said torch at a predetermined distance therefrom, cam means controlling said moving means to move said workpiece through distinct individual steps which may be exactly repeated and means for supplying a welding current to said torch.

12. An automatic welding machine for welding a workpiece having a symmetrical shape with an even number of straight sides wherein the opposite sides are parallel and the arc shaped corners have radii which are constant and equal comprising means for holding said workpiece, a welding torch, means including shuttles for moving said holding means with said workpiece in a fixed plane past said torch at a predetermined distance therefrom, cam means controlling said moving means to move said workpiece through distinct individual steps which may be exactly repeated and means for supplying a welding current to said torch.

13. An automatic welding machine for welding a workpiece having a symmetrical shape with an even number of straight sides wherein the opposite sides are parallel and the arc shaped corners have radii which are constant and equal comprising means for holding said workpiece, a welding torch, means for moving said holding means with said workpiece in a fixed plane past said torch at a predetermined distance therefrom, means for moving said holding means along an arc as a separate individual step to move said workpiece past said torch at said predetermined distance, cam means controlling said moving means to move said workpiece through distinct individual steps which may be exactly repeated and means for supplying a welding current to said torch.

14. An automatic welding machine for welding a workpiece having a symmetrical shape with an even number of straight sides wherein the opposite sides are parallel and the arc shaped corners have radii which are constant and equal comprising means for holding said workpiece, a welding torch, means for moving said torch towards and away from said workpiece, means for moving said holding means with said workpiece in a fixed plane past said torch at a predetermined distance therefrom, cam means controlling said moving means to move said workpiece through distinct individual steps which may be exactly repeated and means for supplying a welding current to said torch.

15. An automatic welding machine for welding a workpiece having a symmetrical shape with an even number of straight sides wherein the opposite sides are parallel and the arc shaped corners have radii which are constant and equal comprising means for holding said workpiece, a welding torch, means for moving said torch towards and away from said workpiece, cam operated means for moving said holding means rectilinearly to move said workpiece past said torch at a predetermined distance therefrom, a further cam operated means for moving said holding means along an arc to move said workpiece past said torch at said predetermined distance, means controlling said two moving means to operate them sequentially, exactly and repeatedly and means for supplying a welding current to said torch.

16. An automatic welding machine for welding a workpiece having a symmetrical shape with an even number of straight sides wherein the opposite sides are parallel and the arc shaped corners have radii which are constant and equal comprising means for holding said workpiece, a welding torch, means for moving said holding means rectilinearly to move said workpiece past said torch at a predetermined distance therefrom, a first motor individually driving said moving means rectilinearly, means for moving said holding means along an arc to move said workpiece past said torch at said predetermined distance, a second motor individually driving said last named moving means along an arc, a second means for moving said holding means rectilinearly following said movement along an arc to move said workpiece past said torch at said predetermined distance, a third motor individually driving said second means for moving said holding means rectilinearly and means for supplying a welding current to said torch.

17. An automatic welding machine for welding a workpiece having a symmetrical shape with an even number of straight sides wherein the opposite sides are parallel and the arc shaped corners have radii which are constant and equal comprising means for holding said workpiece, a welding torch, means for moving said holding means rectilinearly to move said workpiece past said torch at a predetermined distance therefrom, a first motor individually driving said moving means rectilinearly, means for moving said holding means along an arc to move said workpiece past said torch at said predetermined distance, a second motor individually driving said last named moving means along an arc, a second means for moving said holding means rectilinearly a distance different from the movement effected by said first mentioned rectilinear moving means, a third motor individually driving said second means for moving said holding means rectilinearly, cam means controlling said various moving means for said workpiece to operate them sequentially and means for supplying a welding current to said torch.

18. An automatic welding machine for welding a workpiece having a symmetrical shape with an even number of straight sides wherein the opposite sides are parallel and the arc shaped corners have radii which are constant and equal comprising means for holding said workpiece, a welding torch, means for moving said holding means rectilinearly to move said workpiece past said torch at a predetermined distance therefrom, a first motor individually driving said moving means rectilinearly, means for moving said holding means along an arc to move said workpiece past said torch at said predetermined distance, a second motor individually driving said last named moving means along an arc, a second means for moving said holding means rectilinearly a distance different from the movement effected by said first mentioned rectilinear moving means, a third motor individually driving said second means for moving said holding means rectilinearly, means controlling said various moving means for said workpiece to operate them sequentially, means controlling said motors to operate them sequentially, and means for supplying a welding current to said torch.

19. An automatic welding machine for welding a workpiece having a symmetrical shape with an even number of straight sides wherein the opposite sides are parallel and the arc shaped corners have radii which are constant and equal comprising means for holding said workpiece, a welding torch, means for moving said holding means rectilinearly to move said workpiece past said torch at a predetermined distance therefrom, a first motor individually driving said moving means rectilinearly, a second means for moving said holding means along an arc to move said workpiece past said torch at said predetermined distance, a second motor individually driving said last named moving means along an arc, a third means for moving said holding means rectilinearly a distance different from the movement effected by said first mentioned rectilinear moving means, a third motor individually driving said third means for moving said holding means rectilinearly, means controlling said various moving means for said workpiece to operate them sequentially and separately, means controlling said motors to operate them individually sequentially and cyclically, and means for supplying a welding current to said torch.

20. An automatic welding machine for welding a workpiece having a symmetrical shape with an even number of straight sides wherein the opposite sides are parallel and the arc shaped corners have radii which are constant and equal comprising means for holding said workpiece, a welding torch, shuttle means for moving said holding means for said workpiece in individual and separate steps along a predetermined path comprising rectilinear and curved components at a predetermined distance from said torch and cam means controlling said shuttle means.

References Cited by the Examiner

UNITED STATES PATENTS

| | | | |
|---|---|---|---|
| 1,957,489 | 5/34 | Connstock | 219—124 |
| 1,975,578 | 10/34 | Kenney et al. | 219—125 |
| 2,303,720 | 12/42 | Berkeley | 219—124 |
| 2,927,195 | 3/60 | Arnaud | 219—130 |

FOREIGN PATENTS

| | | |
|---|---|---|
| 141,118 | 3/35 | Austria. |
| 511,591 | 11/37 | Great Britain. |

RICHARD M. WOOD, *Primary Examiner.*